Feb. 16, 1932.  E. STARORYPINSKI  1,845,819
RAT AND MOUSE TRAP
Filed Nov. 15, 1930  2 Sheets-Sheet 1

Edgar Starorypinski  INVENTOR
BY Victor J. Evans
ATTORNEY

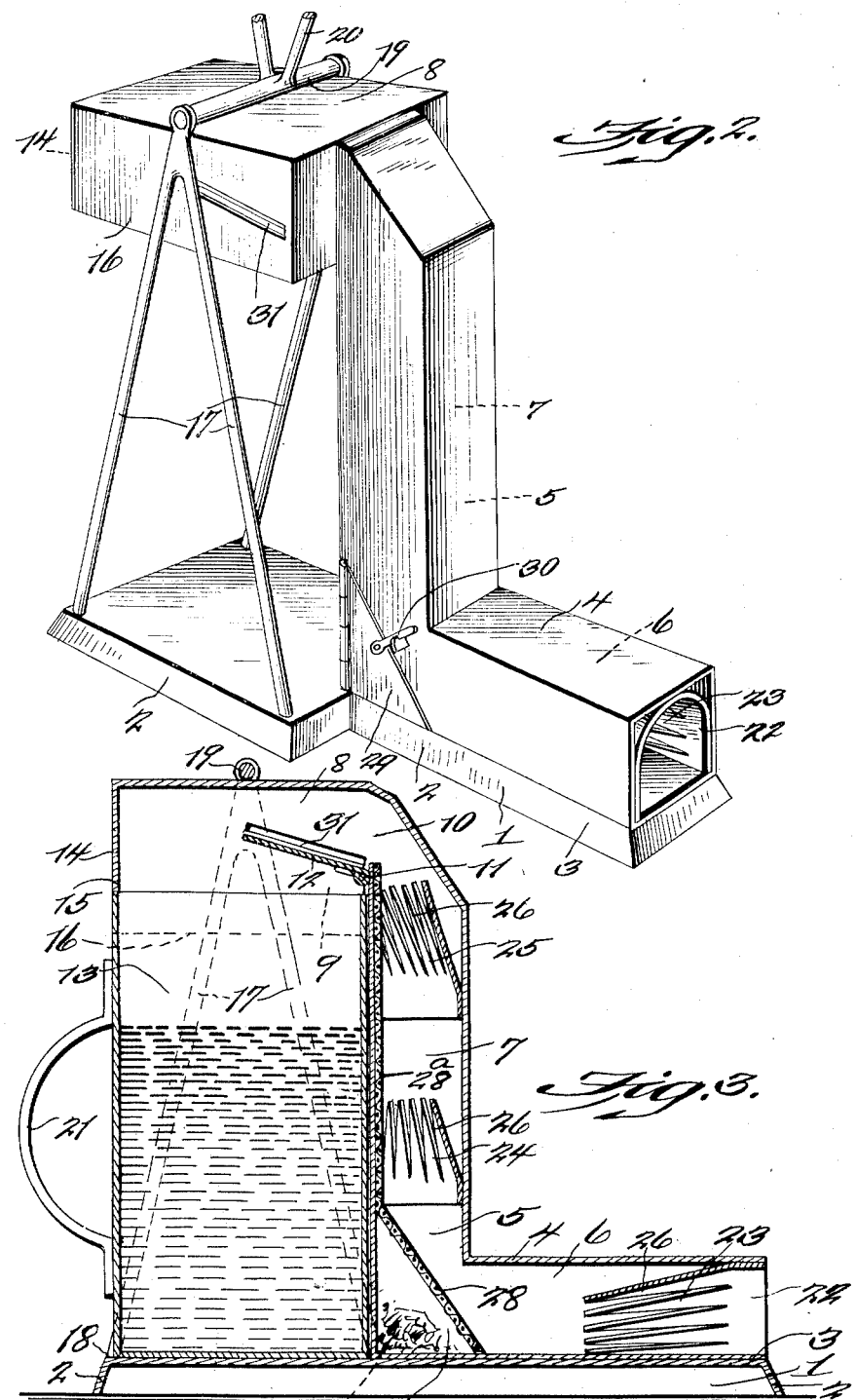

Patented Feb. 16, 1932

1,845,819

UNITED STATES PATENT OFFICE

EDGAR STARORYPINSKI, OF PHILADELPHIA, PENNSYLVANIA

RAT AND MOUSE TRAP

Application filed November 15, 1930. Serial No. 495,965.

The present invention relates to animal traps, and especially to one particularly adapted for catching or trapping rats and mice, it depending entirely on the size, the material and the strength of the construction.

The invention has for its purpose to provide, in a trap of this kind, a construction including an angular passage for the rat or mouse or other animal, with means in the passage to prevent the animal from retreating, in combination with a bait chamber substantially midway of the passage, so constructed as to permit the bait to be inserted or removed at any time, the bait also being observable and so protected as to prevent access thereto by the animal and positioned as to attract the animal into the passage.

Still another purpose is to provide, in a trap of this kind an overhanging housing portion at the terminus of the passage, and under which a specially designed receptacle or tank may be placed and into which the rat, mouse or other animal may fall and then drown, due to the fact that the tank or receptacle is adapted to contain a sufficient quantity of water.

A further purpose is to provide the overhanging part of the passage with a trap door hinged adjacent where the terminus of the passage communicates with interior of the overhanging part, the door being so arranged as to swing downwardly in order to allow the animal to fall into the water, there being inwardly extending abutments formed in the sides of the overhanging passage in order to limit the upward movement of the door, which is under the tension of a spring of sufficient strength as to support the trap door in its normal position in engagement with the abutments until the rat or other animal has reached a substantial position on the door as would not cause the door to give to an extent that would cause the animal to attempt to retreat. However the tension on the spring would be such that when the animal reaches a position a sufficient distance away from the hinge, the weight of the animal will overcome the tension of the spring and cause the door to tilt, thereby causing the animal to drop into the tank.

A still further purpose is to so construct the overhanging part as to fit down over the tank or other receptacle and assist in holding it in position on the base the front wall of the overhanging part being cut away to permit the receptacle or tank to be easily removed or inserted, the tank having a handle, allowing this operation to be performed.

A still further purpose is to provide relatively heavy upstanding handles extending from the base and rigidly connected thereto and in turn connected with rigidity to the overhanging part, enabling the trap to be conveniently moved from one place to another.

It is obvious that by constructing the trap of relatively heavy sheet material it may be used for catching relatively large rats, and by constructing it of relatively light sheet material, the trap may be used for mice. It also is obvious that by constructing the trap from relatively heavy sheet iron the trap may be used for catching various other large animals.

It is to be understood that the particulars herein given are in no way limitative, and that while still keeping within the scope of the invention, any desired modification of details and proportions may be made in the construction of the appliance according to circumstances.

The invention comprises further features and combination of parts to be hereinafter set forth, showing the drawings and claimed:

Figure 2 is a perspective view of the trap showing the receptacle or tank removed.

Figure 3 is a vertical sectional view showing the interior construction of the passage through which the rat, mouse or other animal passes, and illustrating the retreat preventing devices.

Figure 1:
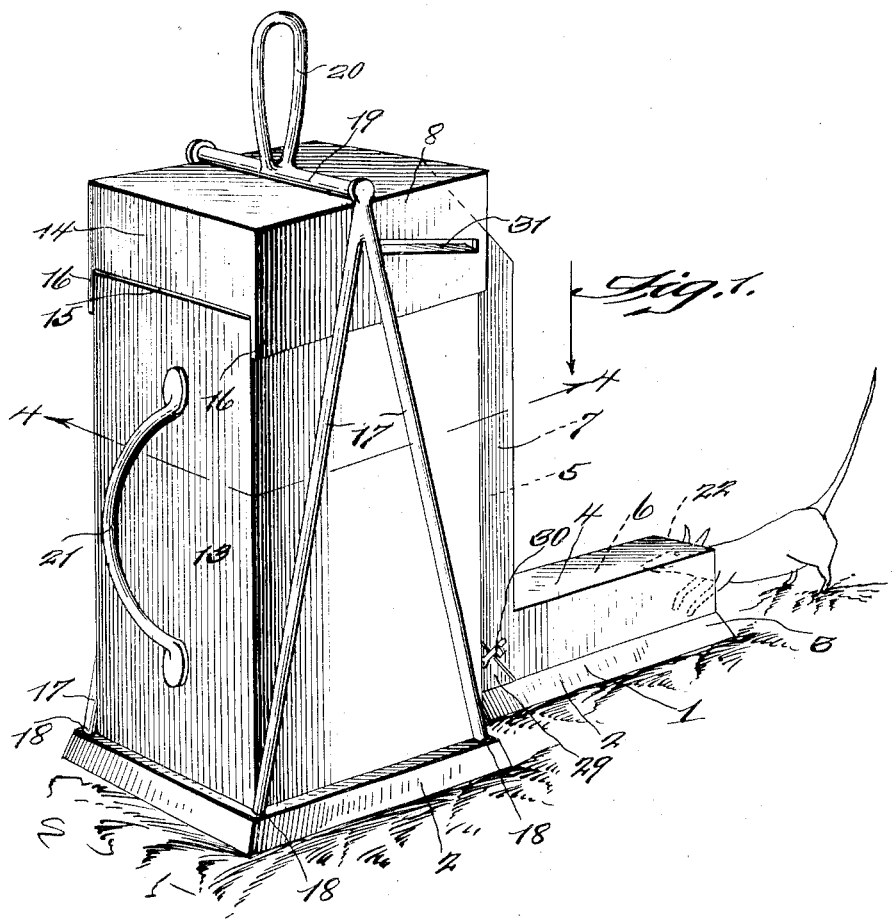
Figure 1 is a perspective view of the improved trap constructed in accordance with the invention.
Figure 4:
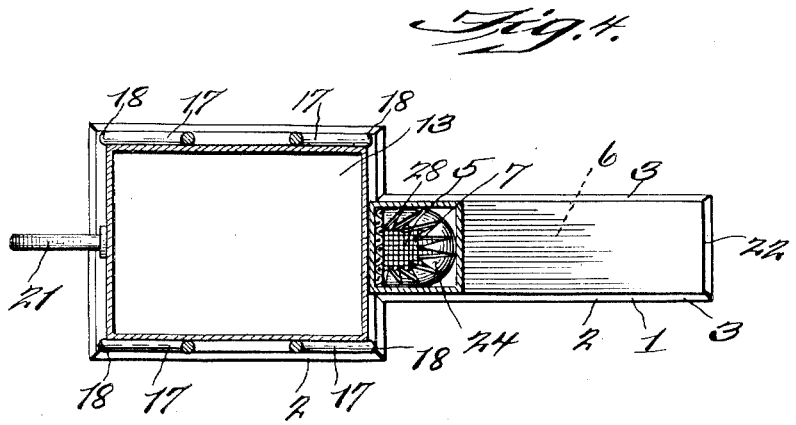
Figure 4 is a transverse sectional view on line 4—4 of Figure 1.

Referring to the drawings 1 identifies a base, which may be any size or shape and is provided with a downwardly extending marginal flange 2, which flares outwardly to properly support the trap and has a tendency to prevent the same from tilting or falling over.

Secured in any well known manner to the reduced portion 3 of the base is a casing 4 which is preferably angular and in fact is shown as being substantially L-shape in formation. The casing provides an animal passage 5 which includes a horizontal portion 6 and a vertical portion 7. The upper or the vertical portion is in communication with a housing portion 8 which has its bottom open as indicated by the reference numeral 9, and the communication between the vertical portion 7 and the housing portion is indicated by the reference numeral 10.

A spring tensioned hinge connection 11 supports a trap door 12 arranged in the path of the animal passing through the portion 7 of the passage 5, and it will be obvious that the tension of the spring of the hinge connection 11 is sufficient to support the weight of an animal until the latter has reached a point on the door whereby its weight would be greater than the tension of the spring, with the result the door will swing downwardly on its hinge and cause the animal to fall into a tank or receptacle 13 having water or other liquid therein and which is positioned below the housing portion 8. The tank or receptacle 13 is of a size and shape to snugly fit between the base 1 and wall 14 of the housing portion 8, as clearly shown in Figure 3 and indicated by the reference numeral 15 and the upper portions of the side walls of the tank or receptacle 13 are disposed within the depending parts 16 of the sides of the housing portion so that the tank or receptacle will be securely held in communication with the housing portion 8 as will be apparent.

Rising from and secured to the base 1 in any suitable manner, but preferably by spot welding, are arms arranged in converging cooperating pairs at opposite sides of the base, and the arms are constructed of relatively heavy wire, with the lower or remote ends of the pairs, secured as at 18 to the base, while their upper ends merge together and have secured thereto a cross bar 19 which is fixed by spot welding or brazing, to the upper face of the housing portion 8. A handle in the form of a loop 20 is carried by the cross rod 19 so that the trap may be easily carried from one place to another.

The tank or receptacle 13 has a handle 21, by which the receptacle may be removed and inserted in position.

Arranged in the passage 5 in any suitable locations, preferably one at the entrance mouth 22 of the passage, another at the point where the vertical portion 7 extends from the horizontal portion and still another just below the hinge connection 11 is a plurality of retreat preventing shields 23, 24 and 25. These shields are arched or curved in cross section and are provided with converging sharpened spikes or blades 26, the construction and arrangement of which is such as to prevent retrogression of an animal. While there are three of these shields shown, it is obvious that any number of such devices may be employed, as may suit the commercial need.

It is obvious that the shield 24 may be eliminated if so desired, so as to not overtorture the animal. However it is believed that the shield 24 will be preferable in most cases though its elimination might hasten the rat, mouse or other animal to its final plunge into the water.

Where the vertical portion 7 of the passage merges into the horizontal part 6 there is a compartment 27 for bait, and the compartment is provided by an open work wall 28 through which the bait is easily observed by the animal, though it prevents access thereto. This wall 28 may be composed of wire mesh and is inclined as shown. A door 29 is hinged to one side of the casing 4 and latched at 30, and which permits the insertion and removal of the bait. The side walls of the housing portion 8 are provided with abutments 31, which are struck up from the material and are disposed in the path of the trap door 12, to limit it in its upward position.

It is obvious that the trap may be any size and may be constructed of any suitable sheet material such as tin, sheet aluminum or sheet iron, it also being obvious that the outer surface of the trap and all of its exposed parts may be provided with a protecting coating of any suitable material, Duco, paint or the like. Also in case the trap is used in the open and especially in the winter weather, the water in the tank or receptacle may contain any suitable anti-freezing solution.

The wall 28 of wire mesh (which may be any suitable gauge) merges into a vertical extension 28a, which lies against the back wall of the vertical part 7 of the passage 5 when the rat, mouse or other animal reaches the wall 28, having been attracted by the bait in the compartment 27 it will crawl up the mesh work and beyond the retreat preventing means until it reaches the trap door 12.

The invention having been set forth, what is claimed is:

1. An animal trap of the character described comprising a base, arms arranged in converging pairs and secured to and rising from said base, a housing portion having an open bottom, a cross arm secured to the upper ends of the pairs of arms and being fixed to the housing portion, a substantially L-shape casing supported by said base and providing an animal passage having its upper end in communication with the housing portion, a trap door hingedly and resiliently secured at the juncture of the passage of the substantially L-shaped casing with the housing portion, means to limit the upward movement of said door and a tank removably disposed between the base and housing portion and disposed in communication with the latter.

2. An animal trap of the character described comprising a base, arms arranged in cooperating pairs and secured to and rising from the base, the arms of a pair being disposed in converging relation with their remote ends fixed to the base, the upper ends of the arms merging into each other, a cross bar secured to the upper ends, a housing portion having an open bottom and secured to and depending from the cross bar for disposal between the pairs of arms, a substantially L-shape casing having its lower portion secured to the base and its upper portion arranged in communication with the housing portion, said casing providing an animal passage and entrance, a bait chamber in said passage, animal retreat preventing shields arranged in said passage, a trap door extending into the housing portion and being resiliently secured at the juncture of the passage with the housing portion, means to limit the upward movement of said door, depending parts formed on the sides of the housing portion, a tank snugly fitting between the base and housing portion and disposed between the depending parts for communication with the housing portion and handles, one for the tank and one carried by the cross bar.

In testimony whereof I affix my signature.

EDGAR STARORYPINSKI.